United States Patent [19]
Kershaw et al.

[11] Patent Number: 5,584,773
[45] Date of Patent: Dec. 17, 1996

[54] FLUID CIRCULATORY SYSTEM FOR AN AXLE ASSEMBLY

[75] Inventors: Samuel L. Kershaw; James T. Passarelli; Frederick C. O'Neill, all of Decatur; David R. Hinton, Mt Zion, all of Ill.

[73] Assignee: Caterpillar Inc., Peoria, Ill.

[21] Appl. No.: 501,753

[22] Filed: Jul. 12, 1995

[51] Int. Cl.$^6$ ................................................. F16H 57/04
[52] U.S. Cl. ........................... 475/160; 475/159; 74/467; 184/6.22
[58] Field of Search .................... 475/159, 160, 475/230; 74/606 R, 467; 184/6.12, 6.22, 6.24, 7.4, 104.1

[56] References Cited

U.S. PATENT DOCUMENTS

| | | | |
|---|---|---|---|
| 1,717,814 | 6/1929 | Strong et al. | 184/6.12 |
| 2,840,186 | 6/1958 | Nyland | 184/6 |
| 3,767,014 | 10/1973 | Drone | 184/6.12 |
| 4,137,997 | 2/1979 | Ando | 184/6.22 |
| 4,227,427 | 10/1980 | Dick | 475/160 X |
| 4,240,524 | 12/1980 | Katayama et al. | 184/6.12 |
| 4,244,242 | 1/1981 | Uno et al. | 475/160 |
| 4,276,960 | 7/1981 | Webb et al. | 184/6.22 |
| 4,319,499 | 3/1982 | Sanui et al. | 475/160 X |
| 4,352,301 | 10/1982 | Fleury | 475/160 X |
| 4,586,395 | 5/1986 | Fukuchi et al. | 475/160 X |
| 4,601,219 | 7/1986 | Iwanaga | 475/160 X |
| 4,656,885 | 4/1987 | Hori et al. | 74/467 |
| 4,915,192 | 4/1990 | Hayashida et al. | 180/309 |
| 4,922,765 | 5/1990 | Hayakawa et al. | 74/467 X |
| 5,222,418 | 6/1993 | Murota | 74/467 X |
| 5,267,489 | 12/1993 | Ziech | 74/606 R |
| 5,302,158 | 4/1994 | Kwasniewski | 74/467 X |
| 5,316,106 | 5/1994 | Baedke et al. | 74/467 X |
| 5,404,963 | 4/1995 | Crepas et al. | 74/467 X |

*Primary Examiner*—Charles A. Marmor
*Assistant Examiner*—Peter Kwon
*Attorney, Agent, or Firm*—William C. Perry

[57] ABSTRACT

In the operation of modern day construction machinery, especially those of relatively large size, it is a common occurrence for the bearings in the axle assemblies to wear during the normal course of operation of the machine. As the wear occurs, minute particles become suspended in the fluid circulated within the axle assembly. As the particulate matter increases the wear is also accelerated and failure of one or more components in the axle assembly will frequently occur. The present invention provides an axle assembly with a filter and a cooler and flow control valve to remove the particulate matter and reduce the heat from the fluid circulated within the axle assembly.

19 Claims, 5 Drawing Sheets

5,584,773

FLUID CIRCULATORY SYSTEM FOR AN AXLE ASSEMBLY

TECHNICAL FIELD

This invention relates to an axle assembly and more particularly to a system that provides cooling and lubrication to the various components of an axle assembly.

BACKGROUND ART

In the operation of construction machines, particularly those that are exceptionally large, the weight of the machines and the torque required to drive the machines often creates excessive heat and wear in the various drive components. One example of this occurs in the axle assemblies of the larger machines such as off highway trucks that work in mines. During normal operation of these trucks, the components from the differential and the final drives experience a small amount of wear from the meshing of gear teeth under high load. As this wear occurs, small particles of the components become suspended in the lubricating oil that circulates through the system. As these particles within the fluid increase the wear will also increase and will eventually result in the failure of one of the components within the axle assembly.

Another byproduct of the operation of the axle assembly of a large machine is excessive heat. In the final drive assemblies for example, a plurality of gears and plant carriers are driven under tremendous loads to provide output to the wheels of the machine. During this operation, it is quite normal for heat to build up within the wheel assemblies. This build up of heat can be alleviated somewhat by the introduction of oil within the system, however the presence of too much oil within the wheel assembly can be a source of heat itself since the churning of the gears and components will tend to heat up the fluid. This heat has also been known to accelerate the wear of the components within the axle assembly.

The present invention is directed to overcoming one or more of the problems as set forth above.

DISCLOSURE OF THE INVENTION

In one aspect of the present invention, an axle assembly is provided with a pair of final drive assemblies that are positioned on opposite end portions of the axle assembly. A differential assembly is provided that includes a bevel gear that is supported for rotation within the differential assembly by a plurality of bearings. An output gear is adapted for rotation with the bevel gear and the entire differential assembly is adapted for driving engagement with each of the final drive assemblies. A fluid reservoir is defined by the axle assembly and a pump, which is adapted for driving engagement with the output gear, is in communication with the fluid reservoir to deliver pressurized fluid therefrom. A flow control valve is adapted to receive the pressurized fluid from the pump and selectively deliver it to each of the final drive assemblies and the bevel gear bearings. The flow control valve is operable in a first condition wherein the fluid flow is directed to each of the wheel assemblies and the bearings in the differential assembly. The flow control valve is also operable in a second condition wherein fluid flow is directed to each of the wheel assemblies, the bevel gear bearings and the fluid reservoir to limit the flow of fluid to the wheel assemblies when the rate of flow within the flow control valve reaches a preselected rate.

In another aspect of the present invention an axle assembly is provided that has an axle housing that defines a fluid reservoir. A differential assembly is included that has a bevel gear rotatably mounted therein. The differential assembly is mounted to the axle housing in a manner wherein at least a portion of the bevel gear is submerged within the fluid reservoir. A shroud member is mounted to the differential assembly and is positioned to surround the bevel gear in closely adjacent relationship thereto. The shroud member is adapted to reduce the churning of the fluid within the reservoir as the bevel gear rotates therewithin.

With an axle assembly as described above, the heat generated within the axle assembly as a result of operation is greatly reduced by the provision of the cooling system. In addition the temperature of the fluid within the reservoir is reduced since the churning of the bevel gear within the reservoir is greatly reduced by the shroud that is positioned around the gear. Also, with the inclusion of the filter, the fluid that is circulated within the axle assembly is cleaned of impurities thereby reducing the incidence of failure of components through contamination.

BEST MODE FOR CARRYING OUT THE INVENTION

Figure 3:
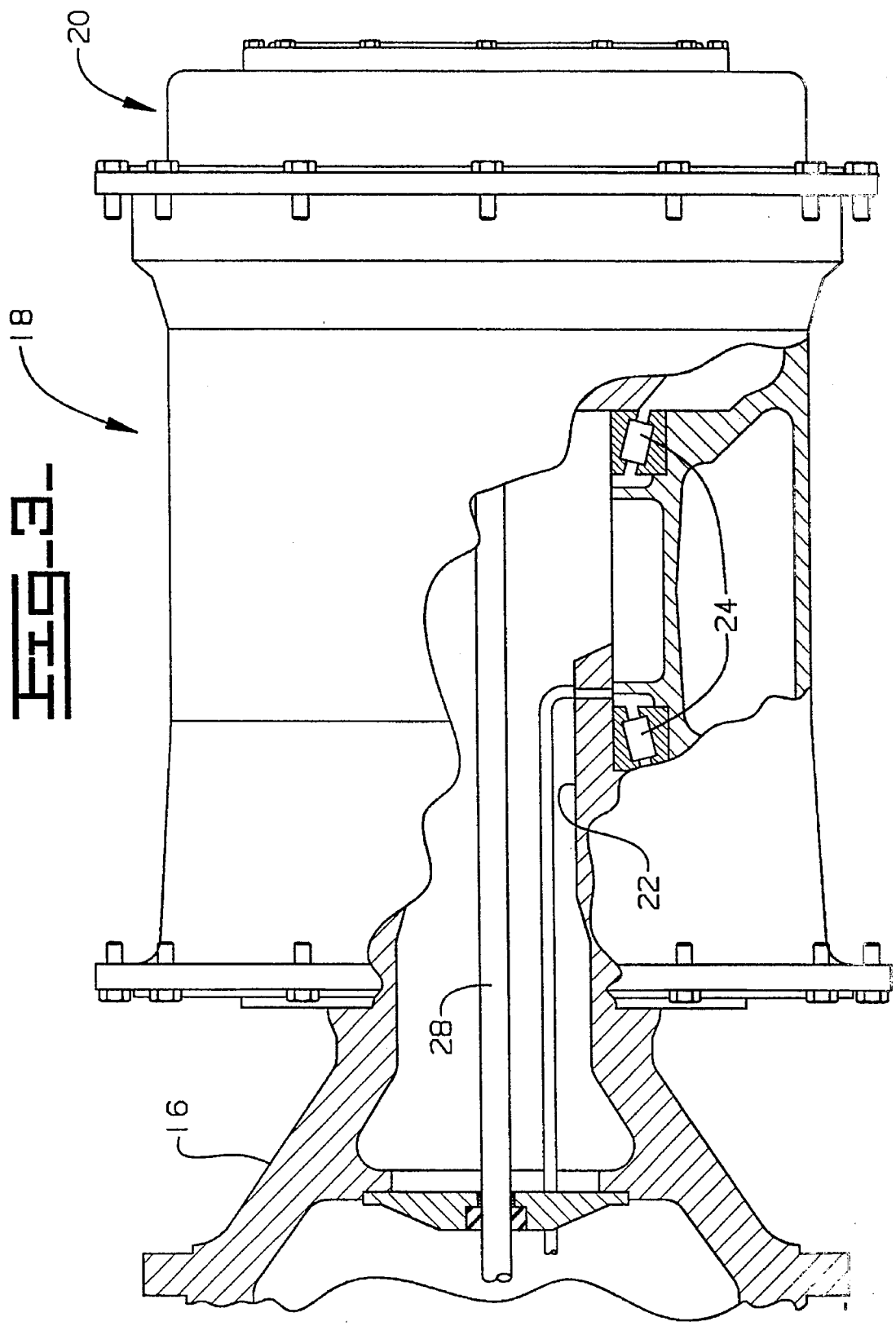
FIG. 3 is a cross-sectional view of the wheel assembly taken along lines 3—3 of FIG. 1.

Referring to the drawings, it can be seen that an axle assembly 10 is disclosed. The axle assembly includes an axle housing 12 that has a central portion 14, commonly referred to as a banjo housing, that is substantially hollow. A pair of identical spindle members 16 (one shown) are mounted on opposite ends of the banjo housing 14 and each spindle member 16 supports a wheel assembly 18 that houses a final drive assembly 20 (FIG. 3). The final drive assemblies are supported on the respective spindle members 16 which are hollow and define a cavity 22 that extends the length thereof. A plurality of bearing members 24 are positioned between the spindle members and their respective wheel assemblies 18 to permit relative rotation about the spindle members. A screen member 25 is positioned over the outermost end portion of the spindle member 16.

Figure 1:
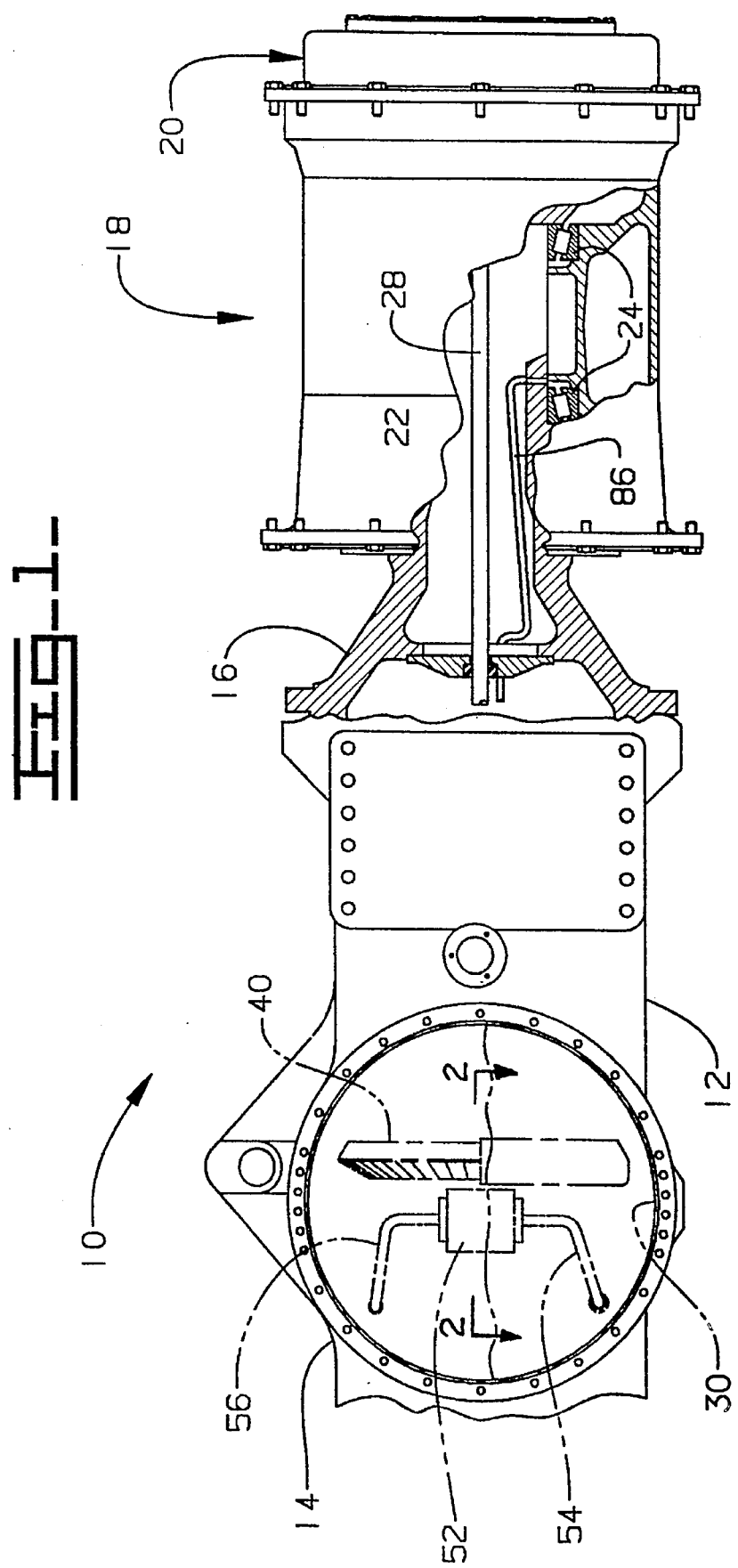
FIG. 1 is a diagrammatic elevational view of an axle assembly that embodies the principles of the present invention.
Figure 2:
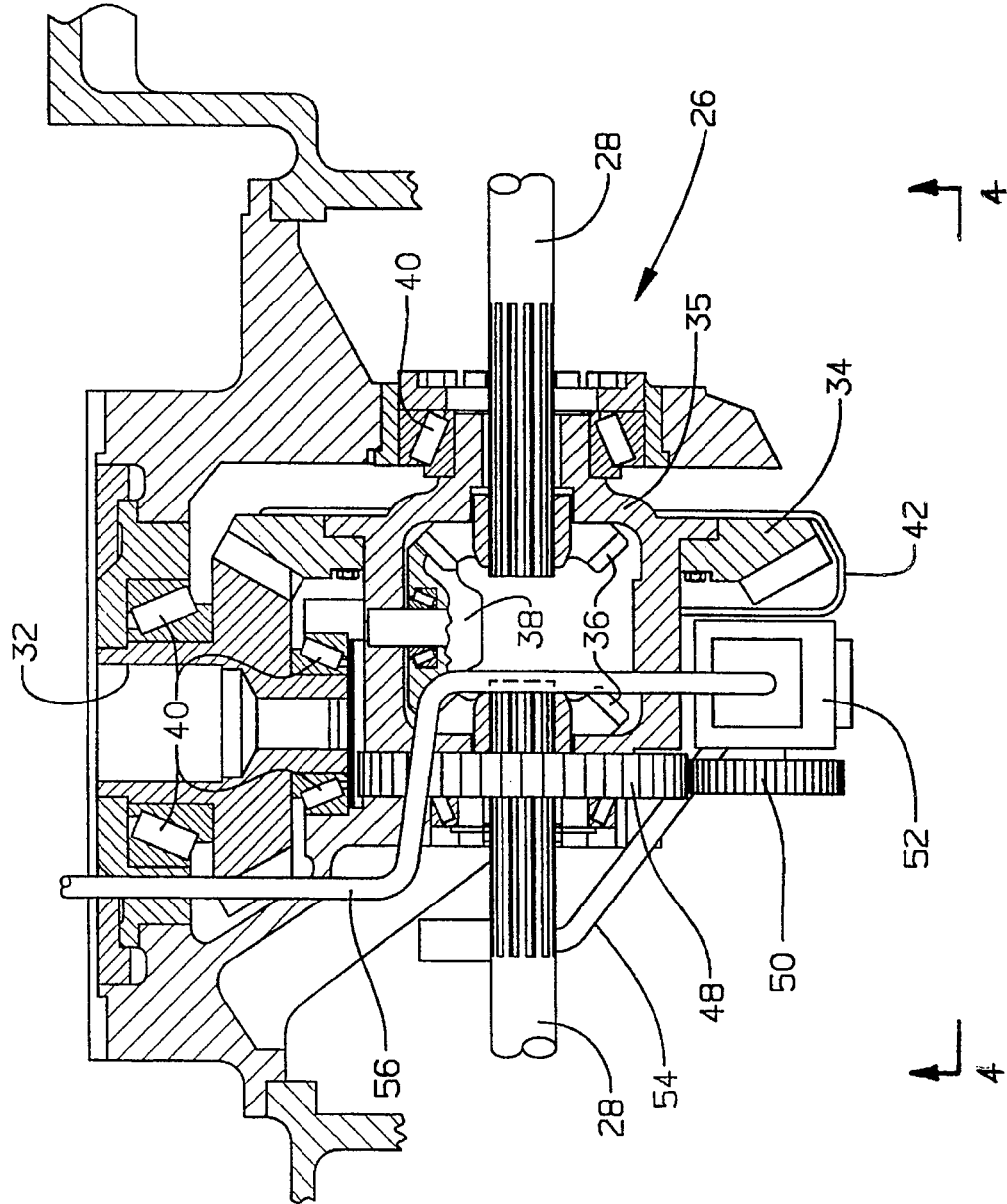
FIG. 2 is a cross-sectional view of the differential assembly taken along lines 2—2 of FIG. 1.

A differential assembly 26 is centrally positioned within the banjo housing 14 and is drivingly connected to each of the final drive assemblies 20 by a drive shaft 28. This portion of the axle housing 12 defines a rounded casing that receives the differential assembly as a preassembled unit. The lower portion of the axle housing forms a well portion that serves as a reservoir 30 (FIG. 1) for the oil or other fluid that is circulated within the assembly. As can be seen in FIG. 2, the differential assembly receives input from a drive shaft (not shown) that is splined to an input gear 32 that engages a bevel gear 34. The bevel gear is mounted to a rotating housing 35 that houses a pair of spider gears 36 and an idler gear 38. The drive shafts 28 are splined to the spider gears and extend from the differential assembly 26 to the final drive assemblies 20 to transmit drive to the wheel assemblies 18. The bevel gear, spider gears and idler gear are all supported within the differential assembly 26 by bearings commonly indicated by reference numeral 40 so that they may rotate relative to the housing and to one another.

The bevel gear 34 is positioned in a substantially vertical plane and has a lower portion immersed in the fluid reservoir 30. A shroud member 42 is mounted to a reinforcing rib 44 defined by the differential assembly 25 by mounting bolts 46. The shroud surrounds the bevel gear in very close proximity thereto and encapsulates the bevel gear in the area that is immersed in the reservoir. This greatly reduces the churning of the fluid within the reservoir. The shroud may be made of any satisfactory material, however in the present invention it is comprised of reinforced resinous material such as fiberglass.

An output gear 48 is mounted to the rotating housing 35 and thereby rotates with the bevel gear 34. The output gear is enmeshed with a drive gear 50 that extends from a pump 52. The pump 52 is in turn, mounted to the differential assembly 26 and has an intake tube 54 extending therefrom that is immersed in the fluid reservoir 30. The pump is sufficient for selectively delivering fluid under pressure from the reservoir to the wheel assemblies 18 and the bearings 40 of the differential assembly in a manner to be described hereinafter.

Figure 4:
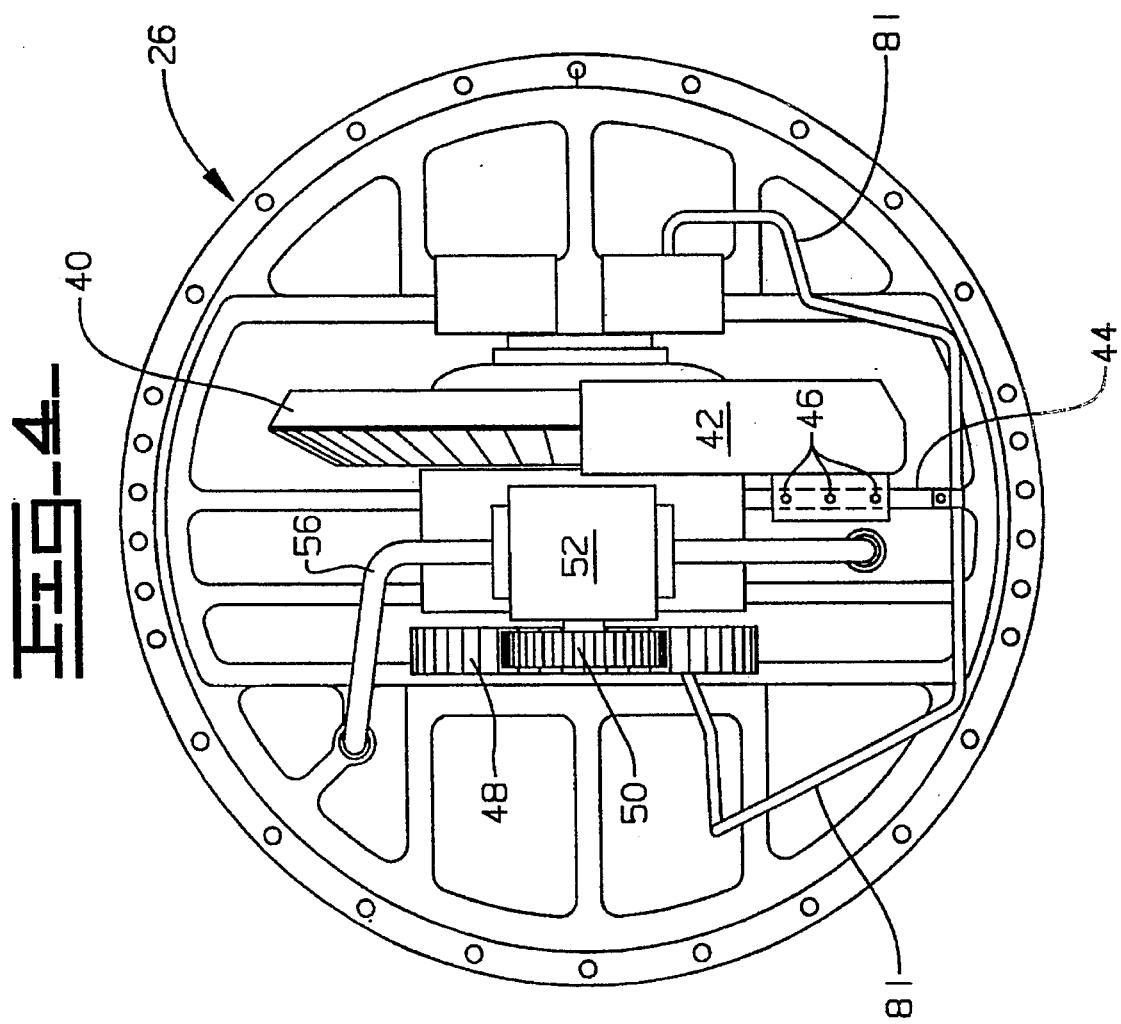
FIG. 4 is a diagrammatic end view of the differential assembly taken along lines 4—4 of FIG. 2.
Figure 5:
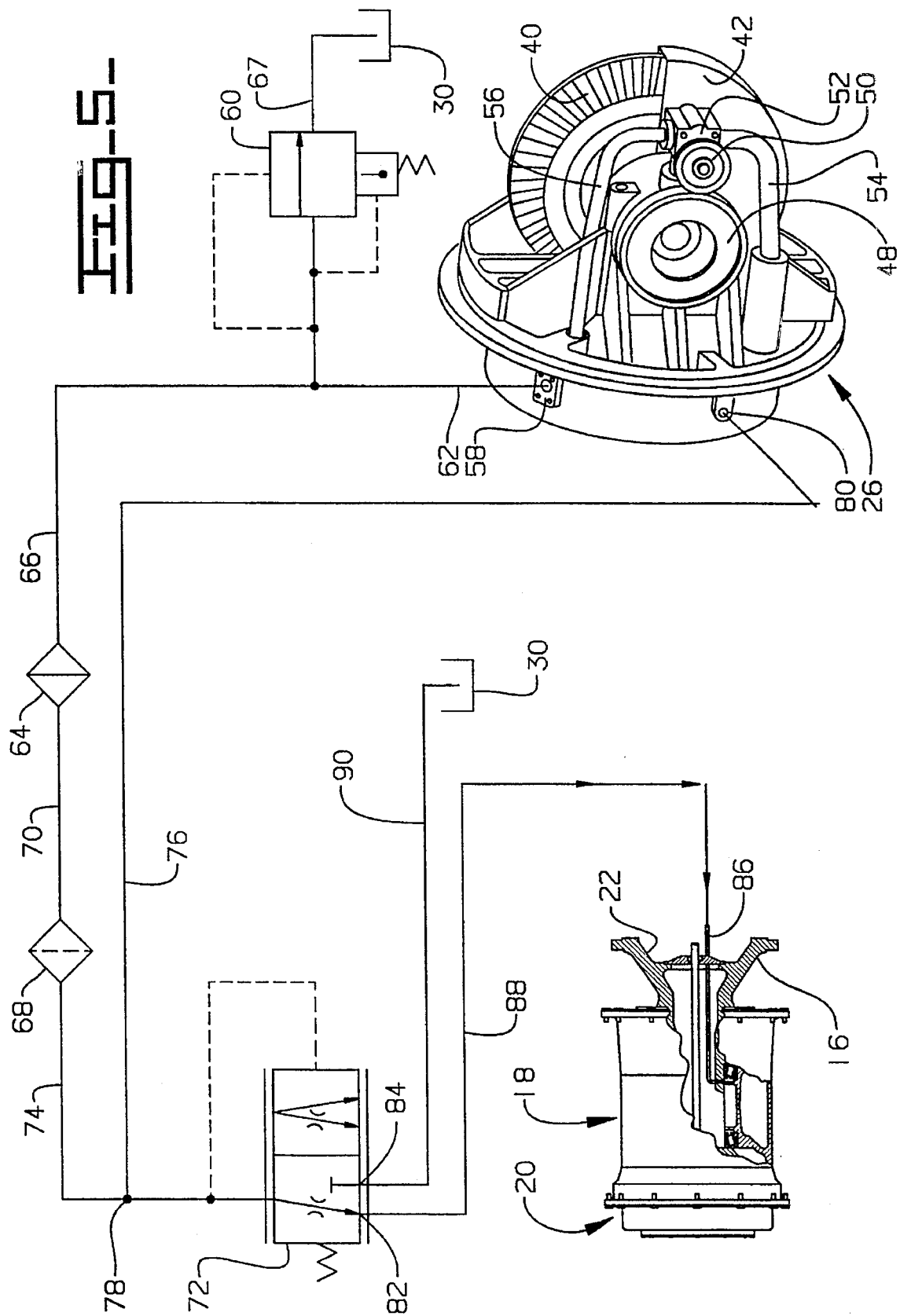
FIG. 5 is a schematic of the cooling and filtration system utilized in the present invention.

Referring now to FIG. 5, it can be seen that the pressurized fluid is carried from the pump 52 by an internal conduit or tube 56 and exits the differential assembly 26 at a port 58. The pressurized fluid is then communicated to a temperature sensitive pressure relief valve 60 by a conduit 62. From the pressure relief valve 60 the fluid is directed to a filter assembly 64 by conduit 66. A second conduit 67 is communicated with the reservoir 30 and fluid is directed back to the reservoir until it has reached a preselected temperature. The pressurized fluid exits the oil filter 64 and is directed to a cooler 68 via conduit 70. The fluid passes through the cooler 68 and is directed to a flow control valve 72 via conduit 74. A conduit 76 is in communication with conduit 74 at a juncture 78 that is positioned just upstream of the flow control valve and directs at least a portion of the fluid to a port 80 on the differential assembly 26. The fluid is then dispersed throughout the differential assembly by a plurality of internal conduits 81 (FIG. 4) that direct fluid to the bearings 40 within the differential assembly.

The flow control valve 72 is of a well known variety and defines a pair of ports 82 and 84. Port 82 is communicated by way of a conduit 88 with an internal tube 86 (FIG. 3) that is positioned in each of the cavities 22 of the respective spindle members 16 by way of conduit 88. Port 84 is communicated with the reservoir 30 via conduit 90 and is initially closed to communication with the fluid introduced into the flow control valve until the amount of flow reaches a predetermined rate which in the instant invention is approximately 12 gpm. The excess flow is bypassed to the reservoir.

INDUSTRIAL APPLICABILITY

In operation, the bevel gear 34 is driven by the input gear 32 which in turn will cause the rotation of the output gear 48. The output gear 48, being enmeshed with the drive gear 50 will cause it to rotate thus driving the pump 52. The pump 52 will draw fluid from the reservoir 30 in the differential assembly 26 through the intake tube 54. The fluid is then delivered under pressure by pump 52 through internal tube 56, port 58 and conduit 62 to the pressure relief valve 60. As previously mentioned, the pressure relief valve is temperature sensitive, passing the fluid back to the reservoir 30 through the second conduit 67 until it has exceeded a preselected temperature which in the instant invention is 110 degrees F. Once the fluid reaches this temperature, the communication with the second conduit 67 is closed off and the fluid is directed to the filter assembly via conduit 66. The fluid is then circulated within the filter in a well known manner to remove the suspended impurities from the fluid.

Once the fluid has passed through the fluid filter assembly 64, it is directed through conduit 70 to the cooler 68. As the fluid circulates within the cooler the temperature of the fluid is reduced to a temperature below 220 degrees F. It is to be understood that the inclusion of the cooler within the system may be optional and that in some instances, the fluid may operate well within an acceptable temperature in absence of a cooler.

The cooled fluid is then directed to the flow control valve 72 through conduit 74. Just prior to introduction into the flow control valve, the fluid is communicated with another conduit 76 that directs a portion of the flow to the differential assembly 26 via port 80. After entering port 80, the fluid is directed to all the various bearings generally indicated by 40 in FIGS. 2 and 3 by way of internally directed conduits 81. Fluid from the conduits provides lubrication for the bearings during operation of the differential assembly. It should be noted that the diameter of the conduits 81 is relatively small. This creates a restriction in the path of communication which results in the bulk of the fluid being directed to the flow control valve 72. The fluid entering the flow control valve 72 is communicated directly with the port 82 where it is in turn communicated with the respective wheel assemblies (one shown) via conduit 88. Within the wheel assemblies, internal conduit 86 communicates the fluid from conduit 88 through the spindle members 16 outwardly to the rotating wheel assemblies 18 to cool them as they rotate. While not specifically shown in the drawings, the fluid is carried outwardly and axially through the wheel assembly to the final drive by a plurality of axially directed passageways (not shown) circumferentially positioned in the wheel assembly. When the flow from the pump 52 reaches 12 gpm, the flow control valve is shifted to bypass the flow to the port 84 and the reservoir 30 via conduit 90. In doing so, the flow to the wheel assemblies is limited so that too much fluid is not directed to each wheel assembly which would ultimately cause the elevation of the temperature within the respective wheel assemblies due to the churning of the final drive components through the large quantity of fluid.

The fluid within the wheel assemblies 18 is forced by their rotation through the outer bearing members into the final drive assemblies 20. The fluid is circulated through the final drive assemblies and eventually is directed through the screen 25 into the cavity 22 defined by the spindle members. Since the elevation of the spindle assemblies is greater than that of the reservoir, gravity will take the fluid inwardly through the spindle members, into the opposing end portions of the axle housing and into the reservoir 30 located in the central portion 14 of the axle housing.

With axle assembly 10 as set forth above, it can be seen that fluid can be circulated by the pump 52 through a filter assembly 64 and a cooler 68 before it is directed to the respective wheel assemblies and the differential bearings 40. In doing so, the fluid is both filtered of suspended impurities and reduced in temperature to greatly increase the life of the components within the axle assembly. In addition, the elevation of the temperature of the fluid within the reservoir is reduced by the placement of the shroud 42 around the submerged portion of the bevel gear. This eliminates unnecessary churning of the oil by the bevel gear as it is rotated therein. Still further, additional protection of the differential components and the fluid within the reservoir is provided in the event of a failure in the final drive. The screen 25 acts to keep foreign matter of any size from entering the axle housing 12 and thus the reservoir 30. This prevents the failure of a component in one of the final drive assemblies 20 from causing any more damage in adjacent components.

Other aspects, objects and advantages of this invention can be obtained from a study of the drawings, the disclosure and the appended claims.

We claim:

1. An axle assembly, comprising:

a pair of final drive assemblies positioned on opposite end portions of the axle assembly;

a differential assembly defining a bevel gear supported for rotation within the differential assembly by a plurality of bearings, an output gear adapted for rotation with the bevel gear, said differential assembly being adapted for driving engagement with each of said final drive assemblies;

a fluid reservoir defined by the axle assembly;

a pump adapted for driving engagement with the output gear and being in communication with the fluid reservoir for delivery of pressurized fluid therefrom; and a flow control valve adapted to receive pressurized fluid from the pump and selectively deliver it to each of the final drive assemblies and the bevel gear bearings, said flow control valve being operable in a first condition wherein fluid flow is directed to each of the wheel assemblies and the bearings in the differential assembly and a second condition wherein fluid flow is directed to each of the wheel assemblies, the bevel gear bearings and the fluid reservoir to limit the flow of fluid to the wheel assemblies when the rate of flow within the flow control valve reaches a preselected rate.

2. The axle assembly as set forth in claim 1 wherein a pressure relief valve is positioned for communication between the pump and the flow control valve, said pressure relief valve being thermostatically controlled so that the pressurized fluid is returned to the fluid reservoir when the temperature of the fluid is below 110 degrees F.

3. The axle assembly as set forth in claim 1 wherein a fluid filter is positioned between the pressure relief valve and the flow control valve to remove suspended impurities from the fluid as it passes therethrough.

4. The axle assembly as set forth in claim 1 wherein a fluid cooler is positioned for communication between the fluid filter and the flow control valve, said fluid cooler being adapted to reduce the temperature of the fluid to a temperature below 220 degrees F before it is introduced to the flow control valve.

5. The axle assembly as set forth in claim 1 wherein the differential assembly is housed within an axle housing, said axle housing defining a cavity that forms the fluid reservoir.

6. The axle assembly as set forth in claim 5 wherein each of the final drive assemblies are supported on spindle members by a plurality of bearings for rotation with respect thereto, said spindle members being substantially hollow to form a cavity and are connected to opposing ends of the axle housing with the respective cavities in communication with the cavity formed by the axle housing.

7. The axle assembly as set forth in claim 6 wherein the fluid from the flow control valve is delivered to the wheel assembly from a conduit positioned within the spindle members and the fluid is returned to the reservoir by gravity feed from the final drive assemblies through the spindle members and into the axle housing.

8. The axle assembly as set forth in claim 7 wherein a screen member is portioned between the end portion of each spindle member and the respective final drive assemblies to prevent debris from passing from the final drive assemblies into the spindle cavities.

9. The axle assembly as set forth in claim 1 wherein a shroud member is mounted to the differential assembly and is positioned to surround the bevel gear is closely adjacent relationship thereto, said member being adapted to reduce the churning of the fluid within the reservoir as the bevel gear rotates therewithin.

10. The axle assembly as set forth in claim 9 wherein the shroud member is formed of fiber reinforced resinous material.

11. An axle assembly, comprising:

an axle housing defining a fluid reservoir;

a differential assembly having a bevel gear rotatably mounted therein and being mounted to the axle housing in a manner wherein at least a portion of the bevel gear is submerged within the fluid reservoir;

a shroud member mounted to the differential assembly and being positioned to surround the bevel gear in closely adjacent relationship thereto, said shroud member being adapted to reduce the churning of the fluid within the reservoir as the bevel gear rotates therewithin.

12. The axle assembly as set forth in claim 11 wherein a pair of final drive assemblies are positioned on opposing ends of the axle housing, each final drive assembly being supported by a hollow spindle member that is mounted to the axle housing, said final drive assemblies being adapted for rotation with respect to the axle assembly.

13. The axle assembly as set forth in claim 12 wherein the differential assembly includes an output gear adapted for rotation with the bevel gear.

14. The axle assembly as set forth in claim 13 wherein a pump having a drive gear is mounted within the differential assembly in communication with the fluid reservoir, said drive gear being adapted for engagement with the output gear to provide actuation of the pump upon rotation of the bevel gear, said bevel gear, output gear and drive gear being mounted for relative rotation within the differential assembly about a plurality of bearings.

15. The axle assembly as set forth in claim 14 wherein a flow control valve is adapted to receive pressurized fluid from the pump and selectively deliver it to each of the final drive assemblies and the differential assembly, said flow control valve being operable in a first condition wherein fluid flow is directed to each of the wheel assemblies and the bearings within the differential and a second condition wherein fluid flow is directed to each of the wheel assemblies, the differential assembly and the fluid reservoir to limit the rate of flow to the wheel assemblies, said second condition being attained when the fluid flow from the pump reaches a preselected rate.

16. The axle assembly as set forth in claim 15 wherein a fluid filter is positioned between the pump and the flow control valve to remove suspended impurities from the fluid as it passes therethrough.

17. The axle assembly as set forth in claim 16 wherein a fluid cooler is positioned for communication between the fluid filter and the flow control valve, said fluid cooler being adapted to reduce the temperature of the fluid to a temperature below 220 degrees F before it is introduced to the flow control valve.

18. The axle assembly as set forth in claim 11 wherein the shroud member is formed of a fiber reinforced resinous material.

19. The axle assembly as set forth in claim 15 wherein the flow control valve operates in its first condition until the flow passing therethrough exceeds 12 gallons per minute.

* * * * *